US010037018B2

(12) United States Patent
Nomoto et al.

(10) Patent No.: US 10,037,018 B2
(45) Date of Patent: Jul. 31, 2018

(54) PRODUCTION PLANNING APPARATUS AND PRODUCTION PLANNING METHOD

(71) Applicant: HITACHI, LTD., Tokyo (JP)

(72) Inventors: Tazu Nomoto, Tokyo (JP); Masayasu Uozaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 15/007,449

(22) Filed: Jan. 27, 2016

(65) Prior Publication Data
US 2016/0282844 A1 Sep. 29, 2016

(30) Foreign Application Priority Data

Mar. 26, 2015 (JP) ................................. 2015-064475

(51) Int. Cl.
*G05B 19/406* (2006.01)
*G06Q 10/06* (2012.01)

(52) U.S. Cl.
CPC ........... *G05B 19/406* (2013.01); *G06Q 10/06* (2013.01); *G06Q 10/067* (2013.01); *G05B 2219/33064* (2013.01)

(58) Field of Classification Search
CPC ........ G05B 19/406; G05B 2219/33064; G06Q 10/06; G06Q 10/067
See application file for complete search history.

(56) References Cited

U.S. PATENT DOCUMENTS

| 5,280,425 A | * | 1/1994 | Hogge | ................... | G06Q 10/06 700/97 |
| 5,586,021 A | * | 12/1996 | Fargher | ............ | G05B 19/41865 700/100 |
| 5,841,659 A | * | 11/1998 | Tanaka | ................... | G06Q 10/06 700/121 |
| 6,311,094 B1 | * | 10/2001 | Iriuchijima | ............ | G06Q 10/06 700/100 |

(Continued)

FOREIGN PATENT DOCUMENTS

JP      2006-99250 A    4/2006

OTHER PUBLICATIONS

Extended European Search Report received in corresponding European Application No. 16153308.8 dated Mar. 21, 2016.

*Primary Examiner* — Ramesh Patel
(74) *Attorney, Agent, or Firm* — Mattingly & Malur, PC

(57) ABSTRACT

Provided is a production planning apparatus including: a storage unit configured to store: actual performance information on a resource required for production; a planning master including a plan of a resource required for work of the production; and a planning parameter including a variable required for a production plan; a parameter generation processing unit configured to change the plan of the resource required for the work, which is included in the planning master, based on a difference between the plan of the resource, which is included in the planning master, and actual performance of the resource required for the production, which is included in the actual performance informa- (Continued)

tion, and change the planning parameter based on how greatly the planning master is changed; and a production plan processing unit configured to calculate a production plan that uses the planning master and the planning parameter.

20 Claims, 14 Drawing Sheets

(56) References Cited

U.S. PATENT DOCUMENTS

| | | | | |
|---|---|---|---|---|
| 6,738,747 B1* | 5/2004 | Tanaka | | G05B 19/41865 700/121 |
| 7,092,775 B2* | 8/2006 | Nomoto | | G06Q 10/04 700/100 |
| 7,693,593 B2* | 4/2010 | Ishibashi | | G06Q 10/06 700/52 |
| 8,818,828 B2* | 8/2014 | Shirasu | | G06Q 10/06 705/7.11 |
| 2004/0039585 A1* | 2/2004 | Kitamura | | G06Q 10/0637 705/7.31 |
| 2005/0132167 A1* | 6/2005 | Longobardi | | G06F 9/5083 712/201 |
| 2005/0137732 A1* | 6/2005 | Chao | | G05B 19/41865 700/100 |
| 2006/0106477 A1* | 5/2006 | Miyashita | | G05B 19/41885 700/103 |
| 2006/0136289 A1* | 6/2006 | Niemann | | G06Q 10/0639 705/7.38 |
| 2006/0142886 A1* | 6/2006 | Ishibashi | | G05B 19/41865 700/99 |
| 2008/0046106 A1* | 2/2008 | Kumagai | | G05B 19/41865 700/96 |
| 2009/0118854 A1* | 5/2009 | Urano | | G06Q 10/06 700/102 |

* cited by examiner

FIG. 3

ACTUAL PRODUCTION PERFORMANCE
STORAGE AREA                    ⌒120

| MANAGE-MENT NO. | ITEM | FACILITY | INPUT DATE | INPUT QUANTITY | COMPLETION DATE | COMPLETED QUANTITY | WORK TIME |
|---|---|---|---|---|---|---|---|
| 01 | PROD1 | LINE1 | 8/19 8:00 | 100 | 8/19 8:45 | 98 | 45 |
| 02 | PROD1 | LINE1 | 8/20 9:45 | 170 | 8/19 10:45 | 170 | 60 |
| ... | ... | ... | ... | ... | ... | ... | ... |

ACTUAL FACILITY OPERATION PERFORMANCE
STORAGE AREA 130

| FACILITY | START DATE/TIME | FINISH DATE/TIME | OPERATION STATE |
|---|---|---|---|
| LINE1 | 8/19 8:00 | 8/19 8:10 | SETUP |
| LINE1 | 8/19 8:10 | 8/19 12:00 | IN OPERATION |
| LINE1 | 8/19 13:45 | 8/19 15:00 | IN OPERATION |
| ... | ... | ... | ... |

FIG. 5

SAFETY STOCK PARAMETER STORAGE AREA　～140

| ITEM | FACILITY | SAFETY STOCK | VALID PERIOD |
|---|---|---|---|
| PROD1 | LINE1 | 5% | 2014/4/1~ |
| UNIT1 | LINE1 | 3 DAYS' WORTH OF STOCK | (NULL) |
| ... | | ... | ... |

ACCELERATED PRODUCTION ALLOWABLE DAY PARAMETER STORAGE AREA 150

| ITEM | FACILITY | ALLOWABLE DAY | VALID PERIOD |
|---|---|---|---|
| PROD1 | LINE1 | 3 | ~2015/3/31 |
| PROD2 | LINE1 | 5 | 2015/4/1~ |
| ... | ... | ... | ... |

SALES PLAN STORAGE AREA  ↗160

| ITEM | SALES SITE | SALES DATE | SALES QUANTITY |
|---|---|---|---|
| PROD1 | M1 | 9/10 | 20 |
| PROD1 | M1 | 9/11 | 400 |
| PROD2 | M1 | 9/12 | 200 |
| PROD1 | M1 | 9/12 | 80 |
| ... | ... | ... | ... |

STOCK INFORMATION STORAGE AREA  170

| ITEM | STOCK SITE | STOCK QUANTITY |
|---|---|---|
| PROD1 | W1 | 100 |
| PROD1 | P1 | 100 |
| ... | ... | ... |

MASTER CHANGE INFLUENCE STORAGE AREA /220

| MASTER | PARAMETER | SIGN | CHANGE RULE |
|---|---|---|---|
| A1 | B | — | SAME |
| A1 | C | + | TWICE |
| ... | ... | ... | ... |

PRODUCTION PLAN STORAGE AREA          250

| ITEM | FACILITY | INPUT DATE | PRODUCTION QUANTITY | COMPLETION DATE |
|---|---|---|---|---|
| PROD1 | LINE1 | 9/5 | 225 | 9/5 |
| PROD2 | LINE1 | 9/6 | 100 | 9/6 |
| ... | ... | ... | ... | ... |

PRODUCTION PLANNING APPARATUS AND PRODUCTION PLANNING METHOD

BACKGROUND OF THE INVENTION

The present invention relates to a production planning apparatus and a production planning method.

In Japanese Patent Laid-open Publication No. 2006-99250, there is disclosed a "lead time/yield rate control program for causing a computer to function as: actual performance collection means for collecting actual values of a lead time and a yield rate of a predetermined product; and statistics analysis means for comparing the actual values of the lead time and the yield rate of the product with standard values of the lead time and the yield rate of the product, and when a comparison result satisfies a predetermined update condition, updating the standard values based on the actual values."

SUMMARY OF THE INVENTION

With the technology disclosed in Japanese Patent Laid-open Publication No. 2006-99250, although the standard values may be replaced with the actual values based on changes in period of time required for production and transportation and in percent defective, it is difficult to take appropriate measures also for information to be adjusted along with the replacement.

It is an object of the present invention to provide a technology for easily creating a production plan with which a delivery date is met and satisfactory productivity is achieved.

This application includes a plurality of means for solving at least a part of the above-mentioned problem, and an example of the plurality of means is as follows. In order to solve the above-mentioned problem, a production planning apparatus according to one embodiment of the present invention includes: a storage unit configured to store: actual performance information on a resource required for production; a planning master including a plan of a resource required for work of the production; and a planning parameter including a variable required for a production plan; a parameter generation processing unit configured to change the plan of the resource required for the work, which is included in the planning master, based on a difference between the plan of the resource, which is included in the planning master, and actual performance of the resource required for the production, which is included in the actual performance information, and change the planning parameter based on how greatly the planning master is changed; and a production plan processing unit configured to calculate a production plan that uses the planning master and the planning parameter.

According to the one embodiment of the present invention, it is possible to easily create a production plan with which a delivery date is met and satisfactory productivity is achieved. Problems, configurations, and effects other than those described above become apparent from the following description of embodiments of the present invention.

BRIEF DESCRIPTION OF THE DRAWINGS

FIG. 3 is a table for showing the structure of data stored in an actual production performance storage area.

FIG. 4 is a table for showing the structure of data stored in an actual facility operation performance storage area.

FIG. 5 is a table for showing the structure of data stored in a safety stock parameter storage area.

FIG. 6 is a table for showing the structure of data stored in an accelerated production allowable day parameter storage area.

FIG. 7 is a table for showing the structure of data stored in a sales plan storage area.

FIG. 8 is a table for showing the structure of data stored in a stock information storage area.

FIG. 9 is a table for showing the structure of data stored in a master change influence storage area.

FIG. 10 is a table for showing the structure of data stored in a production plan storage area.

FIG. 13 is a diagram for showing an example of an output screen, which is output as a result of the parameter optimization processing.

DESCRIPTION OF THE PREFERRED EMBODIMENTS

Figure 1:
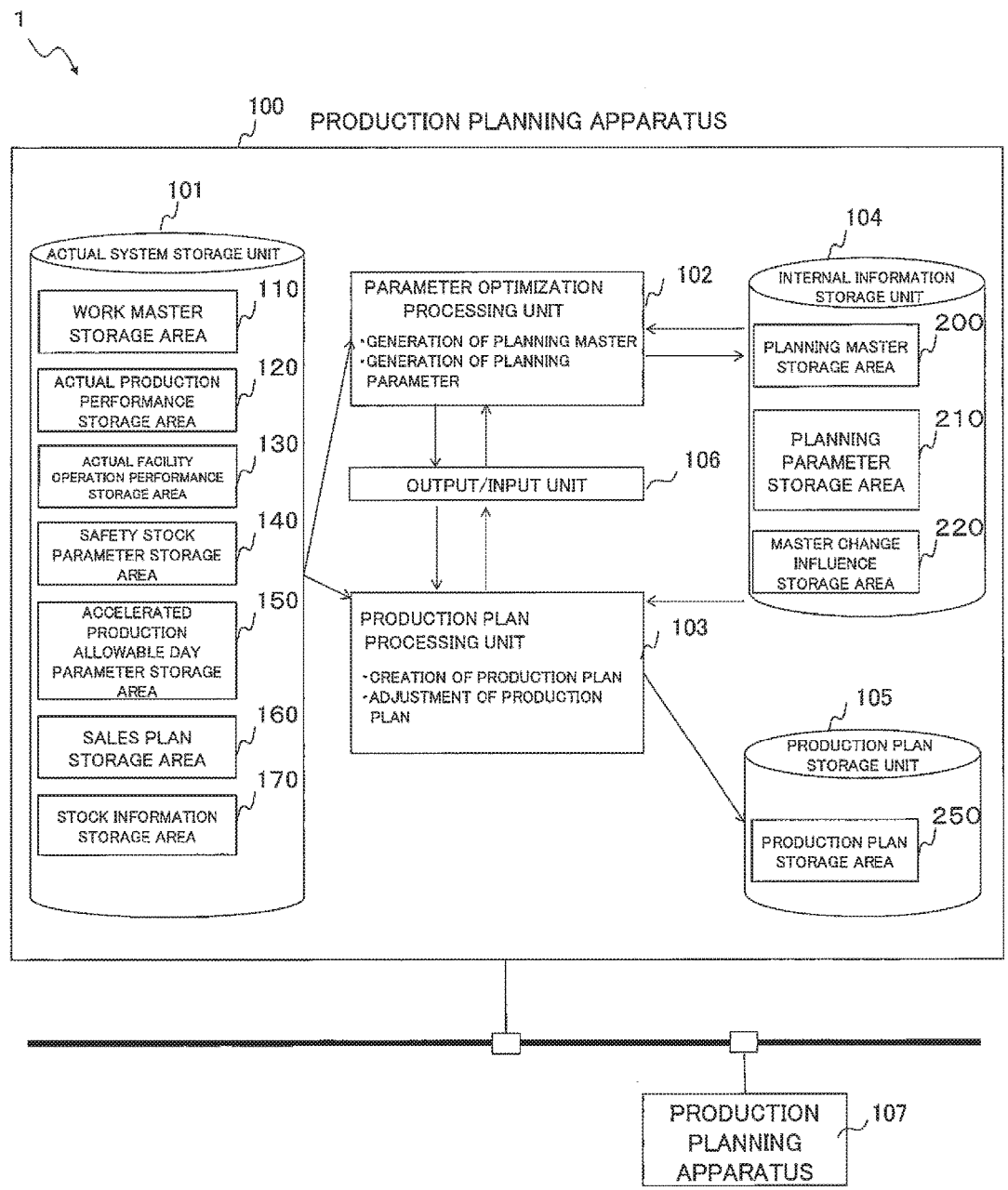
FIG. 1 is a diagram for illustrating an overview of a production planning system according to a first embodiment of the present invention.

In general, in order to create a production plan, the following items of information are required: (1) inquiry information and stock information such as a sales plan and a shipment plan; (2) information on a member and a production line/facility to be used, which are required for production of a product or a semi-finished product; and (3) information on a period of time required for production and transportation and a percent defective. Efficiency is achieved when the inquiry information of the item (1) is created by a marketing division or a sales division and the stock information of the item (1) is input and managed by a division that owns the actual stock of products. The information of the items (2) and (3) is called "master" in general, and is often created by a designing division or a production technology division and managed by a mission-critical system or an enterprise resource planning (ERP) system. A production plan is created by a production management division using the information of the items (1) to (3), and at the time of creation of a production plan, a large number of efforts are made in order to create a plan with which a delivery date is met and productivity is maximized. For example, such production plans are made that items are produced earlier or a larger number of items are produced in consideration of risks of fluctuations in sales and production, and that the amounts of production are smoothed among days based on production capabilities of a production line, a production facility, and a worker.

As described above, in order to create a production plan with which a delivery date is met and satisfactory productivity is achieved, it is necessary to make efforts in terms of creation of a production plan while ensuring that data of the items (1) to (3) is correct. However, among the data of the items (1) to (3), the data of the item (3) is easily changed depending on skill of a worker who produces or transports an item, climate, or other external factors. It is therefore desired that efforts in terms of production planning be also changed in accordance with a change of the data of the item (3). For example, a case is considered where an actual value of the percent defective has lowered since a certain date. In this case, the following effort is conceivable. Specifically, a safety stock is set in preparation for deterioration of the percent defective until the percent defective becomes stable, and when a period in which the percent defective becomes stable is observed, a stock quantity is adjusted so as to minimize the safety stock to be held after this period. However, for example, when the production management division cannot grasp a change of the data of the item (3), the production management division may make an inappropriate "effort", which may lead to an excess or shortage of production.

Moreover, such efforts in terms of production planning are supplemented with know-how of the production management division in many cases. Accordingly, when a person in charge who belongs to the production management division is transferred to another division or a production factory is relocated to another place, there arises a problem in that know-how of the current person in charge or factory is not handed down to a new person in charge or a new factory, and hence a production plan cannot be created with efficiency. Further, also when a new factory is constructed in a foreign country and the new factory is run by local staff, there arises a problem in that a period of trial and error is prolonged because detailed know-how about a product to be produced is not accumulated in the new factory.

Now, a description is made of embodiments of the present invention with reference to the drawings. Note that, in all figures for illustrating the embodiments, the same members are generally denoted by the same reference symbols, and a repetitive description thereof is omitted.

Now, a description is made of a production planning system 1 serving as an example of a production planning system according to a first embodiment of the present invention with reference to the drawings.

FIG. 1 is a diagram for illustrating an overview of the production planning system 1 according to the first embodiment of the present invention. The production planning system 1 includes a production planning apparatus 100 and a production planning apparatus 107 serving as another production planning apparatus, which is connected to the production planning apparatus 100 over a network in a communicable manner. The production planning apparatus 100 includes an actual system storage unit 101, a parameter optimization processing unit 102, a production plan processing unit 103, an internal information storage unit 104, a production plan storage unit 105, an output/input unit 106, and a communication bus for connecting those units to one another. Note that, a user (e.g., a person in charge of production planning) uses functions of the production planning apparatus 100 through an operation of an input/output device connected to the output/input unit 106. The production planning apparatus 100 can be constructed with the use of a general computer (e.g., a PC), and implements its characteristic processing functions (respective processing units of the production planning apparatus 100) through, for example, processing of software programs.

The input/output device is connected to the output/input unit 106, and includes an input device configured to receive an input on an input screen through the user's operation and an output device configured to output calculation results of a production plan and the like. Examples of the input device include a keyboard and a mouse, and examples of the output device include a display and a printer. In this system, a graphical user interface (GUI) is constructed on an output screen, and various types of information are displayed on the GUI.

The actual system storage unit 101 is constructed with the use of a known component such as a hard disk drive (HDD) or a solid state drive (SSD). In the actual system storage unit 101, copies of various types of data to be used in an actual system are stored. The actual system includes a production management control apparatus configured to perform actual control based on a plan created by the production planning apparatus 100 and others. Specifically, the actual system storage unit 101 includes a work master storage area 110, an actual production performance storage area 120, an actual facility operation performance storage area 130, a safety stock parameter storage area 140, an accelerated production allowable day parameter storage area 150, a sales plan storage area 160, and a stock information storage area 170.

Figure 2:
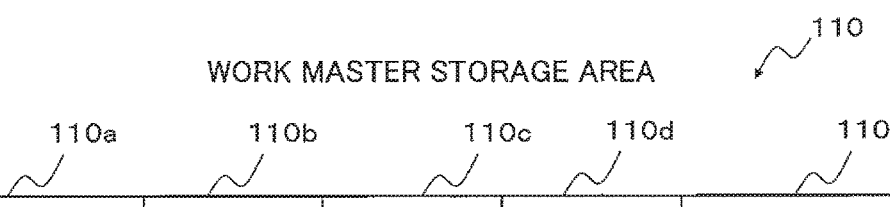
FIG. 2 is a table for showing the structure of data stored in a work master storage area.

FIG. 2 is a table for showing the structure of data stored in the work master storage area 110. The work master storage area 110 includes an item 110a, a facility 110b, a setup time 110c, a work time 110d, and a percent defective 110e in association with one another. The item 110a is information specifying a product or a part of a product. The facility 110b is information specifying a facility where the item specified by the item 110a is to be produced. The setup time 110c is information specifying a period of time of adjustment for a setup. A setup is required as a preparation for producing the item specified by the item 110a at the facility specified by the facility 110b. The work time 110d is information specifying a period of time required to produce a unit of the item specified by the item 110a at the facility specified by the facility 110b. The percent defective 110e is information specifying a ratio of manufacturing defects, which occur at the time of producing the item specified by the item 110a at the facility specified by the facility 110b. In other words, the percent defective 110e is a planned percent defective. As described above, the work master storage area 110 is a planning master including a plan of a resource required for work of the production.

FIG. 3 is a table for showing the structure of data stored in the actual production performance storage area 120. The actual production performance storage area 120 includes a management No. 120a, an item 120b, a facility 120c, an input date 120d, an input quantity 120e, a completion date 120f, a completed quantity 120g, and a work time 120h. The management No. 120a is a management number for specifying actual production performance. The item 120b is information specifying a product or a part of a product. The facility 120c is information specifying a facility where the item specified by the item 120b was produced. The input date 120d is information specifying a date and time when a raw material for producing the item specified by the item 120b was input at the facility specified by the facility 120c. The input quantity 120e is information specifying the quantity of raw materials (which is indicated by the number of products or parts produced) that were input to produce the item specified by the item 120b at the facility specified by the facility 120c. The completion date 120f is information specifying a date and time when the production of the entire product or the entire part of the product specified by the item 120b was completed. The completed quantity 120g is information specifying the quantity of the items specified by the item 120b that were produced at the facility specified by the facility 120c. The work time 120h is information specifying a period of time that was required to produce the item specified by the item 120b at the facility specified by the facility 120c. In other words, the actual production performance storage area 120 is actual performance information on a resource required for production.

FIG. 4 is a table for showing the structure of data stored in the actual facility operation performance storage area 130. The actual facility operation performance storage area 130 includes a facility 130*a*, a start date/time 130*b*, a finish date/time 130*c*, and an operation state 130*d*. The facility 130*a* is information specifying a facility of production. The start date/time 130*b* is information specifying a date and time when preparation for production was completed at the facility specified by the facility 130*a*. The finish date/time 130*c* is information specifying a date and time when an operation was finished at the facility specified by the facility 130*a*. The operation state 130*d* is information specifying whether or not the facility specified by the facility 130*a* is in operation. In other words, the actual facility operation performance storage area 130 is the actual performance information on a resource required for production.

FIG. 5 is a table for showing the structure of data stored in the safety stock parameter storage area 140. The safety stock parameter storage area 140 includes an item 140*a*, a facility 140*b*, a safety stock 140*c*, and a valid period 140*d*. The item 140*a* is information specifying a product or a part of a product. The facility 140*b* is information specifying a facility where the item specified by the item 140*a* is to be produced. The safety stock 140*c* is information specifying a safety stock quantity of the items specified by the item 140*a*. The valid period 140*d* is information specifying a period during which the safety stock quantity specified by the safety stock 140*c* is to be applied. Note that, when the valid period 190*d* is "Null", this indicates that the safety stock 140*c* is always valid. In other words, the safety stock parameter storage area 140 is a planning parameter including a variable required for a production plan.

FIG. 6 is a table for showing the structure of data stored in the accelerated production allowable day parameter storage area 150. The accelerated production allowable day parameter storage area 150 includes an item 150*a*, a facility 150*b*, an allowable day 150*c*, and a valid period 150*d*. The item 150*a* is information specifying a product or a part of a product. The facility 150*b* is information specifying a facility where the item specified by the item 150*a* is to be produced. The allowable day 150*c* is information specifying the number of days for which an accelerated production of the item specified by the item 150*a* is allowable. The valid period 150*d* is information specifying a period during which the allowable days specified by the allowable day 150*c* are to be applied. Note that, when the valid period 150*d* is "Null", this indicates that the allowable day 150*c* is always valid. In other words, the accelerated production allowable day parameter storage area 150 is the planning parameter including a variable required for a production plan.

FIG. 7 is a table for showing the structure of data stored in the sales plan storage area 160. The sales plan storage area 160 includes an item 160*a*, a sales site 160*b*, a sales date 160*c*, and a sales quantity 160*d*. The item 160*a* is information specifying a product or a part of a product. The sales base 160*b* is information specifying a site where the item specified by the item 160*a* is to be sold. The sales date 160*c* is information specifying a date when the item specified by the item 160*a* is to be sold. The sales quantity 160*d* is information specifying the quantity of the items specified by the item 160*a* that are to be sold at the sales site specified by the sales site 160*b* on the date specified by the sales date 160*c*.

FIG. 8 is a table for showing the structure of data stored in the stock information storage area 170. The stock information storage area 170 includes an item 170*a*, a stock site 170*b*, and a stock quantity 170*c*. The item 170*a* is information specifying a product or a part of a product. The stock site 170*b* is information specifying a site where the item specified by the item 170*a* is stocked. The stock quantity 170*c* is information specifying the quantity of the items specified by the item 170*a* that are stocked at the stock site specified by the stock site 170*b*.

The parameter optimization processing unit 102 uses the information stored in the actual system storage unit 101 and information stored in the internal information storage unit 104 to perform parameter optimization processing to be described later, and stores new master information and new parameter information, which are results of the calculation, in a planning master storage area 200 and a planning parameter storage area 210 of the internal information storage unit 104 as a planning master and a planning parameter, respectively.

The production plan processing unit 103 uses the information stored in the actual system storage unit 101 and the information stored in the internal information storage unit 104 to perform production plan adjustment processing, and stores new production plan information, which is a result of the calculation, in a production plan storage area 250 of the production plan storage unit 105.

Note that, as necessary, the parameter optimization processing unit 102 and the production plan processing unit 103 display on the output/input unit 106 the planning master/planning parameter and information on the production plan, respectively. In addition, the parameter optimization processing unit 102 connects to the production planning apparatus 107 serving as another production planning apparatus (e.g., the production planning apparatus 107 located in a region different from where the production planning apparatus 100 is located) as necessary, and receives a parameter optimization request from each region and transmits the calculated planning master and planning parameter to each region.

The internal information storage unit 104 is constructed with the use of a known component such as an HDD or an SSD. In the internal information storage unit 104, the planning master and the planning parameter calculated by the parameter optimization processing unit 102 are stored. Specifically, the internal information storage unit 104 includes the planning master storage area 200, the planning parameter storage area 210, and a master change influence storage area 220.

The planning master storage area 200 is a collective term for a storage area for storing information on the planning master, and includes a storage area having the same data structure as that of the work master storage area 110 of the actual system storage unit 101.

The planning parameter storage area 210 is a collective term for a storage area for storing information on the planning parameter, and includes storage areas having the same data structures as those of the safety stock parameter storage area 140 and the accelerated production allowable day parameter storage area 150 of the actual system storage unit 101.

FIG. 9 is a table for showing the structure of data stored in the master change influence storage area 220. The master change influence storage area 220 includes a master 220*a*, a parameter 220*b*, a sign 220*c*, and a change rule 220*d*. The master 220*a* is information specifying an item of master information to be changed. The parameter 220*b* is information specifying a parameter item to be influenced by a change of the item specified by the master 220*a*. The sign 220c is information indicating a direction of an influence on the parameter 220b. For example, when the sign 220c is a minus sign, this indicates that the value of the item specified by the parameter 220b decreases as the value of the item specified by the master 220a increases. On the other hand, when the sign 220c is a plus sign, this indicates that the value of the item specified by the parameter 220b increases as the value of the item specified by the master 220a increases. The change rule 220d is information specifying a specific relationship of the influence on the parameter 220b. For example, when the change rule 220d is "Same", this indicates that as the value of the item specified by the master 220a increases, the value of the item specified by the parameter 220b increases or decreases by the same amount as the increase in the master 220a. On the other hand, when the change rule 220d is "Twice", this indicates that as the value of the item specified by the master 220a increases, the value of the item specified by the parameter 220b increases or decreases by an amount twice as much as the increase in the master 220a.

The production plan storage unit 105 is constructed with the use of a known component such as an HDD or an SSD. In the production plan storage unit 105, data of the production plan calculated by the production plan processing unit 103 is stored. Specifically, the production plan storage unit 105 includes the production plan storage area 250.

FIG. 10 is a table for showing the structure of data stored in the production plan storage area 250. The production plan storage area 250 includes an item 250a, a facility 250b, an input date 250c, a production quantity 250d, and a completion date 250e. The item 250a is information specifying a product or a part of a product. The facility 250b is information specifying a facility where the item specified by the item 250a is to be produced. The input date 250c is information specifying a date and time when a raw material for producing the item specified by the item 250a is to be input at the facility specified by the facility 250b. The production quantity 250d is information specifying the quantity (which is indicated by the number of products or parts produced) of the items specified by the item 250a that are to be produced at the facility specified by the facility 250b. The completion date 250e is information specifying a date and time when the production of the entire product or the entire part of the product specified by the item 250a is to be completed.

In this system, the actual system storage unit 101, the internal information storage unit 104, and the production plan storage unit 105 may be provided in another apparatus connected over the network or another network (not shown) such as the Internet, and the parameter optimization processing unit 102 and the production plan processing unit 103 may access the information stored in the respective storage units through communication to/from the other apparatus.

Note that, the network may be of any type of network selected from among various types of networks such as the Internet, a local area network (LAN), a wide area network (WAN), a cellular phone network, or a wireless communication network.

Figure 11:
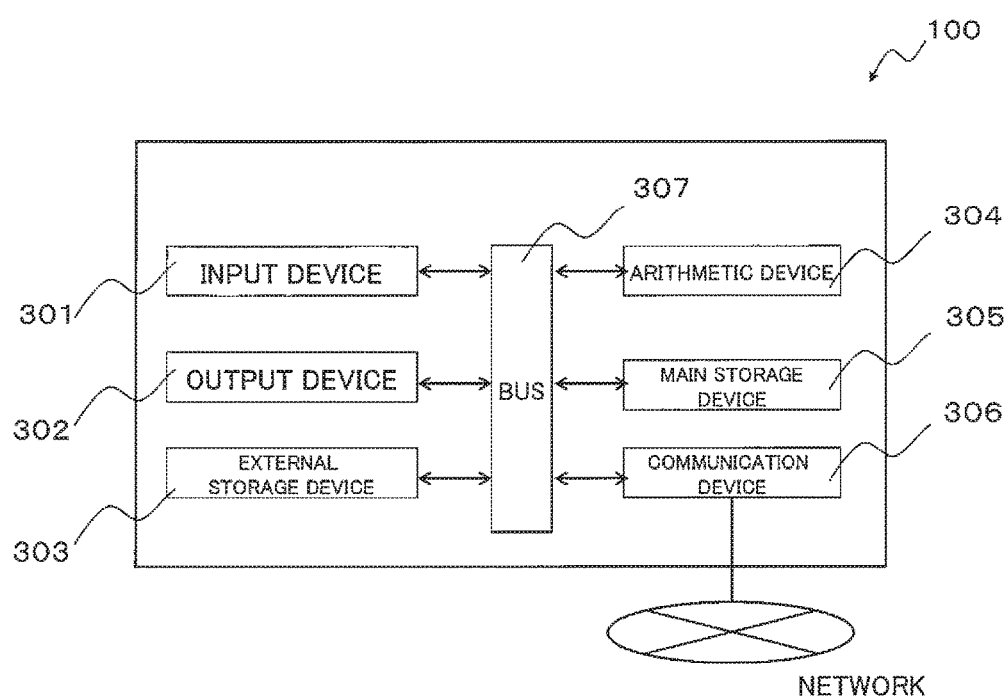
FIG. 11 is a diagram for illustrating a hardware configuration of a production planning apparatus.

FIG. 11 is a diagram for illustrating a hardware configuration of the production planning apparatus 100. The production planning apparatus 100 is typically a personal computer, but the present invention is not limited thereto, and the production planning apparatus 100 may be an electronic information terminal such as a smartphone, a mobile phone terminal, or a personal digital assistant (PDA).

The production planning apparatus 100 includes an arithmetic device 304 such as a central processing unit (CPU), a main storage device 305 such as a memory, an external storage device 303 such as a hard disk or an SSD, an input device 301 such as a keyboard or a mouse, an output device 302 such as a display or a printer, a communication device 306 such as a network interface card (NIC), and a bus 307 for connecting those devices to one another.

The communication device 306 is, for example, a wired communication device configured to perform wired communications through a network cable or a wireless communication device configured to perform wireless communications via an antenna. The communication device 306 performs communications to/from another apparatus connected to a network.

The main storage device 305 is, for example, a memory such as a random access memory (RAM). The external storage device 303 is a so-called nonvolatile storage device, such as a hard disk, an SSD, or a flash memory, which can store digital information.

The input device 301 is a device configured to receive input information, including a pointing device such as a keyboard or a mouse, a touch panel, and a microphone functioning as a voice input device.

The output device 302 is a device configured to generate output information, including a display, a printer, and a speaker functioning as a voice output device.

The parameter optimization processing unit 102 and the production plan processing unit 103 described above are implemented by a program for causing the arithmetic device 304 to perform relevant processing. This program is stored in the main storage device 305 or the external storage device 303, and loaded onto the main memory device 305 for execution and then executed by the arithmetic device 304.

Further, the actual system storage unit 101, the internal information storage unit 104, and the production plan storage unit 105 are implemented by the main storage device 305 and the external storage device 303.

Further, when the production planning apparatus 100 includes a communication unit (not shown), the communication unit is implemented by the communication device 306. Further, the output/input unit 106 is implemented by the output device 302 and the input device 301.

The configuration described above is a hardware configuration example of the production planning apparatus 100 of the production planning system 1 according to this embodiment. However, the hardware configuration of the production planning apparatus 100 is not limited to this configuration example, and the production planning apparatus 100 may be constructed with the use of other hardware components. For example, the production planning apparatus 100 may be a stand-alone production planning apparatus 100, which is not connected to any network.

Note that, although not shown, the production planning apparatus 100 includes known components such as an operating system (OS), middleware, and an application program. In particular, the production planning apparatus 100 has an existing processing function for displaying a GUI screen on the input/output device such as a display. The parameter optimization processing unit 102 and the production plan processing unit 103 use this existing processing function to perform processing of rendering a predetermined screen to display the screen, and to process data information input by a user through the screen, for example.

[Description of Operation]

Next, a description is made of an operation of the production planning system 1 according to this embodiment.

Figure 12:
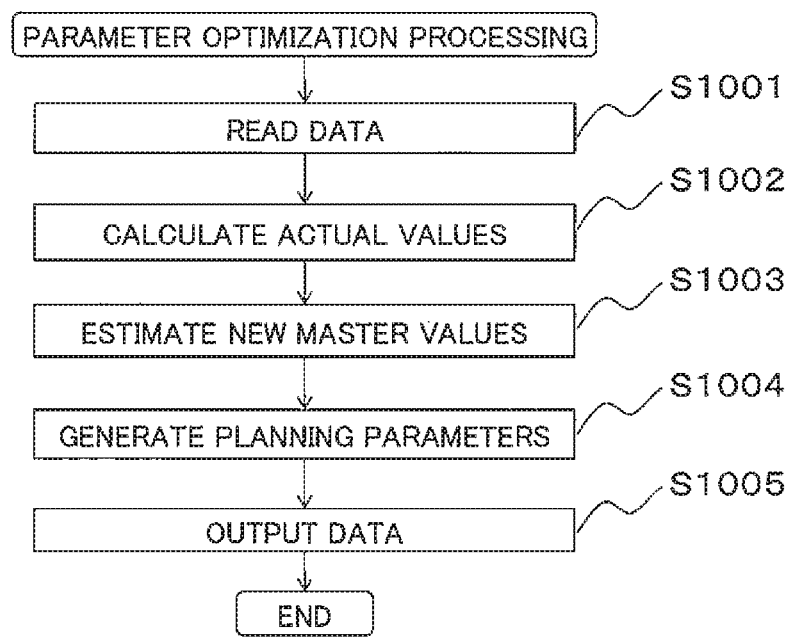
FIG. 12 is a flowchart for illustrating an operation flow of parameter optimization processing.

FIG. 12 is a flowchart for illustrating an operation flow of the parameter optimization processing. The parameter optimization processing to be executed by the production planning apparatus 100 according to this embodiment is started when an instruction to start the parameter optimization processing is received from a user (worker) under a state in which the production planning apparatus 100 is activated.

The parameter optimization processing unit 102 of the production planning apparatus 100 reads the information stored in the actual system storage unit 101 and the internal information storage unit 104 (Step S1001). Specifically, the parameter optimization processing unit 102 reads the work master storage area 110, the actual production performance storage area 120, the actual facility operation performance storage area 130, the safety stock parameter storage area 140, and the accelerated production allowable day parameter storage area 150 of an actual system for which the parameters of a production plan are to be optimized.

The parameter optimization processing unit 102 then calculates actual values (Step S1002). Specifically, the parameter optimization processing unit 102 acquires, from the actual facility operation performance storage area 130, the operation state 130d of a relevant facility during a period from the input date 120d to the completion date 120f of the actual production performance storage area 120, and divides an operation time (a period during which a relevant facility is in operation and which falls between the start date/time 130b and the finish date/time 130c associated with the relevant facility and further falls between the input date 120d and the completion date 120f) by the input quantity 120e, to thereby calculate a work time required to produce a unit of a product or a part of an item. Further, the parameter optimization processing unit 102 subtracts the completed quantity from the input quantity and divides a difference obtained by the subtraction by the input quantity, and then calculates the resultant value as the percent defective. In the example of FIG. 3 and FIG. 4, the operation time of a facility "LINE1" is calculated to be 35 minutes (a period from 8:00 to 8:45, excluding a period (8:00 to 8:10) of a setup) and the input quantity is 100, and hence a work time is calculated to be 21 seconds per product or part (0.35 minute). Moreover, the percent defective is calculated to be 2% (value obtained by dividing a difference "2", which is obtained by subtracting the completed quantity "98" from the input quantity "100", by the input quantity "100"). In summary, the parameter optimization processing unit 102 calculates a setup time of 10 minutes, a work time of 21 seconds, and a percent defective of 2% as actual values of an item "PROD1" and the facility "LINE1" of a management No. "01".

Then, the parameter optimization processing unit 102 estimates new master values (Step S1003). Specifically, the parameter optimization processing unit 102 estimates new master values on a new plan based on the actual values calculated in Step S1002. Note that, the new master values are master values obtained as a result of the estimation. In the present invention, a method of estimating the new master values is not limited to a specific method. Various methods are conceivable, such as a simple method of obtaining an average, a median, a maximum value, a minimum value, or the like, or a method of estimating new master values through statistical analysis (e.g., regression analysis), but the new master values are obtained as a result of processing that is based on a predetermined algorithm.

Then, the parameter optimization processing unit 102 generates planning parameters (Step S1004). Specifically, the parameter optimization processing unit 102 determines whether or not there is a discrepancy of a predetermined level or more between each of the existing master values and a corresponding new master value. In this embodiment, a method of determining whether or not there is such a discrepancy is not limited to a specific method. For example, the following method is conceivable. Specifically, a threshold value of a discrepancy defined in advance is assigned to each item of a master, and when a difference between an existing master value and a corresponding new master value exceeds the threshold value, it is determined that there is a discrepancy. However, a method for discrepancy determination is not limited to this method. For example, a method of testing significance based on statistical analysis may be employed.

In any case, for every item of the master value for which it is determined that there is a discrepancy, while considering a case where an existing master value is held as it is and a case where the existing master value is changed to a new master value separately, the parameter optimization processing unit 102 estimates how a production plan is to be changed in each of those cases. For example, it is assumed that the setup time of 10 minutes, the work time of 21 seconds, and the percent defective of 2% are obtained as new master value of the item "PROD1" and the facility "LINE1" as in the example described above. It is also assumed that corresponding master values of an existing work master are 10 minutes, 30 seconds, and 10%, respectively. When the work time is focused on, the new master value is shortened by 9 seconds (30%) as compared with the existing master value. If the master value is changed to the new master value of 21 seconds, in a new production plan, a total work time required is estimated as the work time shorter than the current one. The new master value is merely an estimated value, and hence a future work time is estimated to vary between the new master value and the existing master value. When a production plan is created with the use of the new master value, it is preferred to anticipate that there is a risk that the work time may be 30 seconds at the maximum, which is the current master value. In order to create a production plan with which a delivery date is met, which is an object of the present invention, when the work of production is started a little earlier, a risk of being late for the delivery date can be reduced even if some pieces of work take 30 seconds to produce a product or a part. In view of this, when the new master value is adopted, it is preferred to increase the value of the "allowable day" of accelerated production, which is the planning parameter. A method of setting the value of the allowable day is not limited to a specific method, but it is assumed that the new master value reduces the work time by a period of time corresponding to 30% of the existing master value. Referring to the example of FIG. 6 to see the current allowable day of accelerated production, the allowable day 150c is 3 days until Mar. 31, 2015, and is 5 days on and after Apr. 1, 2015. When the current month is August, 2014 and the new master value is to be adopted in the next month, the allowable day is 3 days in the next month under the current planning parameter, and hence it is preferred that the allowable day is set to 4 days, which is obtained by increasing the existing master value by 30%. In other words, it is desired that the allowable day during a period until Aug. 31, 2014 is kept to 3 days and the allowable day during a period between Sep. 1, 2014 and Mar. 31, 2015 is changed to 4 days.

In such estimation of a production plan, a rule-based method is adopted, in which a rule for calculation of a planning parameter based on an amount of change in master value is defined in advance. Specifically, the parameter optimization processing unit 102 refers to the master change influence storage area 220 to identify an item of the parameter 220b of a record in which the master 220a corresponds to a master value for which a discrepancy is found, and determines a change amount of the planning parameter that is based on an increase or decrease of the master value in accordance with the sign 220c and the change rule 220d.

Similarly, the percent defective also decreases from an existing master value of 10% to a new master value of 2%. It is conceivable that, as in the work time, the actual value of the percent defective may vary between 2% to 10%. When a production plan is created with the use of the new master value of 2% but the actual value of the percent defective is calculated to be 10%, shortage in the completed quantity occurs. In order to eliminate such a risk in advance, it is preferred that the value of the safety stock of the planning parameter is changed to a large value. It is desired that when the new master value of the percent defective is changed to 2%, which is obtained by subtracting 8%, the percent defective of the safety stock on the planning parameter is changed accordingly so that the percent defective is increased from 5% to 13%, which is obtained by adding 8%, on and after Sep. 1, 2014. How to change the percent defective is also stored in the master change influence storage area 220 as a rule in advance, and hence the parameter optimization processing unit 102 can change the parameter appropriately. Further, in addition to the above-mentioned relationships between the work time and the allowable day of accelerated production and between the percent defective and the safety stock, by storing various relationships between master items and corresponding parameter items as rules in advance, appropriate optimization of parameters can be realized.

Then, the parameter optimization processing unit 102 outputs data (Step S1005). Specifically, the parameter optimization processing unit 102 outputs information including data that is obtained as results of the calculation in Steps S1002 to S1004 to the output/input unit 106, the planning master storage area 200, and the planning parameter storage area 210.

Figure 13:
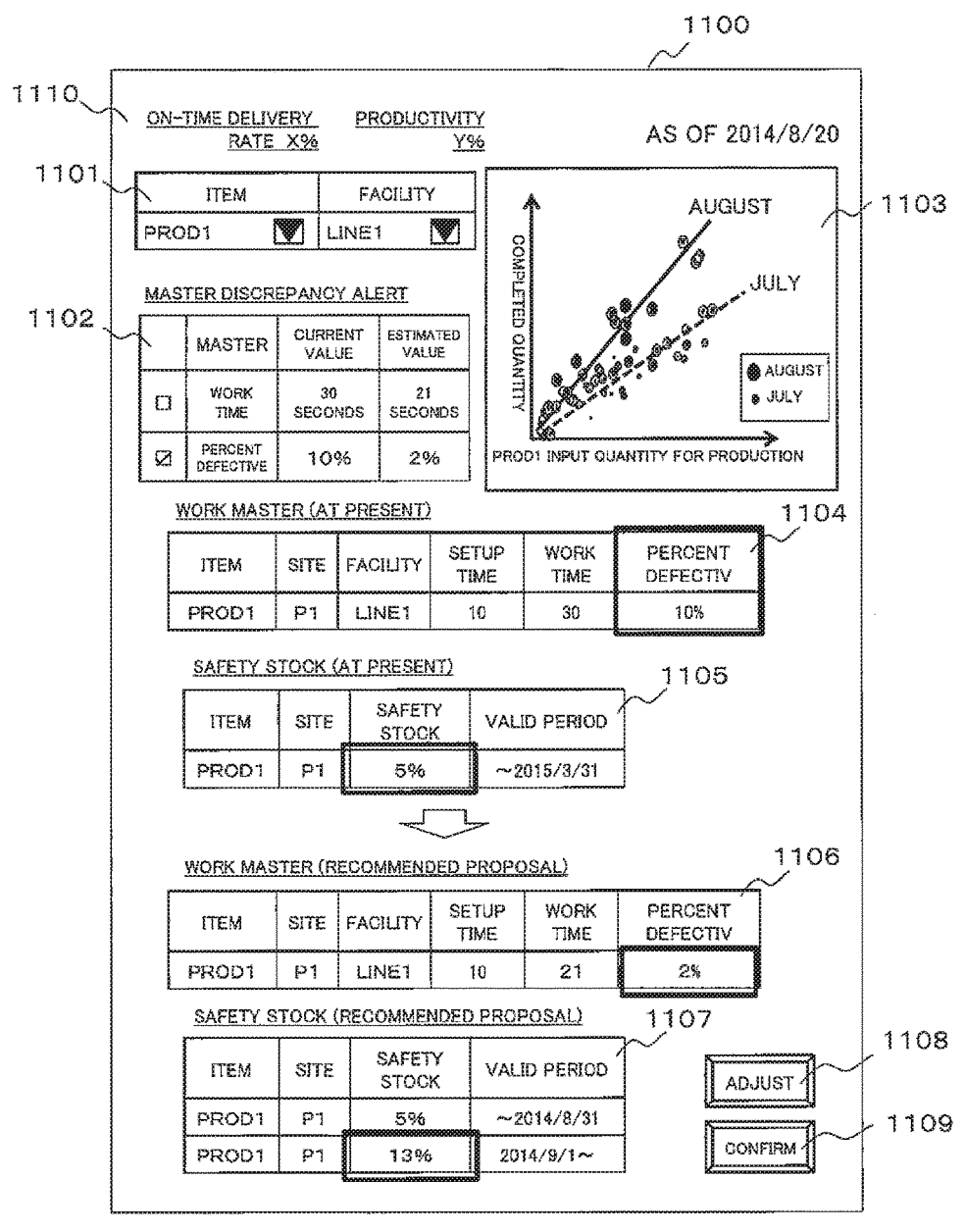

FIG. 13 is a diagram for showing an example of an output screen 1100, which is output as a result of the parameter optimization processing. The output screen 1100 includes an area 1110, an adjustment target area 1101, a master discrepancy alert display area 1102, an actual value display area 1103, a work master (at present) display area 1104, a safety stock (at present) display area 1105, a work master (recommended proposal) display area 1106, a safety stock (recommended proposal) display area 1107, an "adjust" button 1108, and a "confirm" button 1109. The area 1110 displays an on-time delivery rate and productivity to be achieved by the new master and the new planning parameter. The adjustment target area 1101 displays a combination of an item and a facility in which a discrepancy is found in the planning master in a manner that allows selection. The master discrepancy alert display area 1102 displays an item of the master in which a discrepancy is found, the value of the item, and an estimated value for adjustment. The actual value display area 1103 displays graphs of the actual values. The work master (at present) display area 1104 displays current master values. The safety stock (at present) display area 1105 displays a current safety stock. The work master (recommended proposal) display area 1106 displays master values after being changed. The safety stock (recommended proposal) display area 1107 displays a safety stock after being changed. The "adjust" button 1108 receives an instruction to execute recalculation using a new master value after a master value is adjusted through re-input of the master value. The "confirm" button 1109 receives an instruction to execute processing of reflecting the new master value in the existing master value.

In other words, on the output screen 1100, when receiving a combination of an item and a facility in the adjustment target area 1101, the parameter optimization processing unit 102 displays a list of items of the planning master in which a discrepancy is found in the master discrepancy alert display area 1102. When receiving selection of one of the items of the planning master, the parameter optimization processing unit 102 checks a checkbox of a portion of the master discrepancy alert display area 1102 in which the received item of the planning master is displayed, and outputs, for display, corresponding calculated values to the actual value display area 1103, the work master (at present) display area 1104, the safety stock (at present) display area 1105 to be changed in relation, the work master (recommended proposal) display area 1106, the safety stock (recommended proposal) display area 1107, and the area 1110 for showing an on-time delivery rate and productivity.

Note that, in FIG. 13, an example is shown in which the percent defective is selected and selection of the percent defective is received as a master item, and various actual values and planned values related to the percent defective is displayed. However, the present invention is not limited thereto. Moreover, how to display the actual values related to the percent defective is also not limited to the method of this example, and the percent defective may be displayed in the form of a line graph in which a horizontal axis represents days and a vertical axis represents the percent defective, or may be displayed in the form of a list.

In addition, frames of the work master (at present) display area 1104 and the work master (recommended proposal) display area 1106 that correspond to the item "percent defective" and frames of the safety stock (at present) display area 1105 and the safety stock (recommended proposal) display area 1107 that correspond to the item "safety stock" are highlighted with the use of thick frames, color, or the like. When the depression of the "adjust" button 1108 is received, the new master value highlighted in the work master (recommended proposal) display area 1106 can be changed. A range of values in which the value can be changed is a range of from the new master value to the current master value. In this example, the value can be changed within a range of from the new master value of 2% to the current master value of 10%. When receiving an input of the changed new master value, in the processing of Step S1004 in which the planning parameters are generated, the parameter optimization processing unit 102 calculates the value of the planning parameter taken when the changed value is set as the new master value. For example, when the new master value of the percent defective is changed from 2% to 5%, the value of the safety stock (recommended proposal) is changed from 13% to 10%. The new planning parameter value is displayed in the safety stock (recommended proposal) display area 1107, and at the same time, a portion in which the new value is displayed is highlighted with the use of a thick frame, a predetermined color, or the like so that a change of the value can be identified. When receiving the depression of the "confirm" button 1109, the parameter optimization processing unit 102 stores the new master values and the new planning parameter values in the master values and the parameter values of the actual system storage unit 101, and stores the new master values and the new planning parameter values in the master values and the parameter values of the internal information storage unit 104 by overwriting the current master values and parameter values with the new values. When the "confirm" button 1109 is not depressed, the new master values and the new parameter values are temporarily stored in the internal information storage unit 104 in addition so that the new master values and the new parameter values can be referred to later.

In the above, the processing flow of the parameter optimization processing is described. According to the parameter optimization processing, it is possible to present a proposal of a change of the master value and to easily identify a parameter item to be changed along with the change of the master value and a value of the parameter item.

Figure 14:
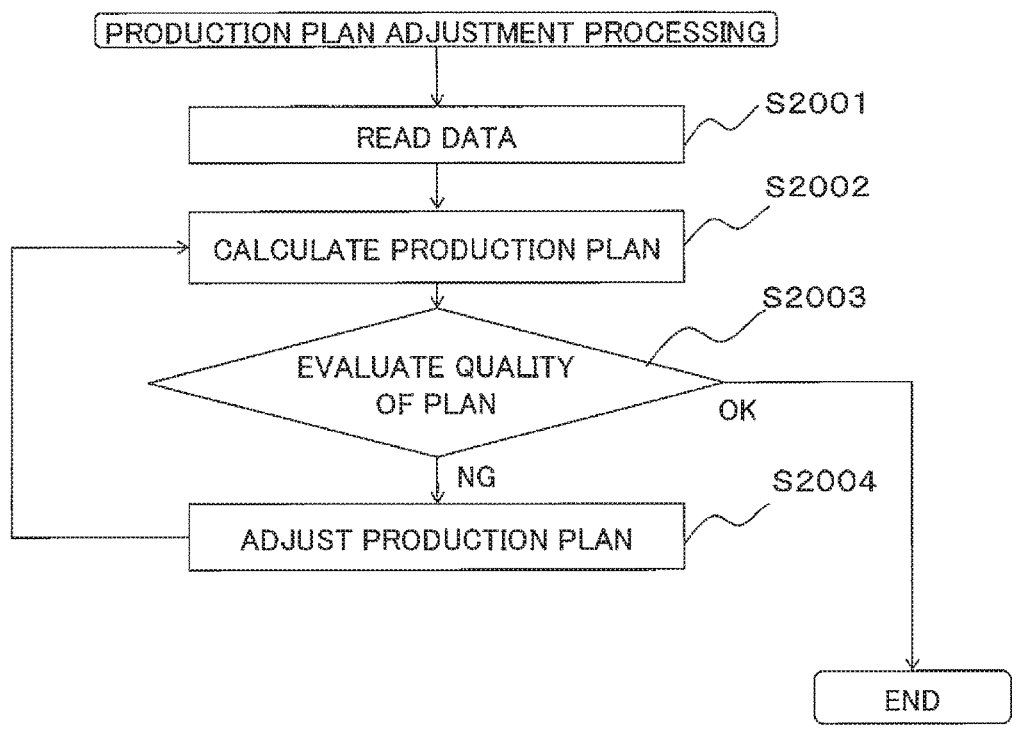
FIG. 14 is a flowchart for illustrating an operation flow of production plan adjustment processing.

FIG. 14 is a flowchart for illustrating an operation flow of the production plan adjustment processing. The production plan adjustment processing may be started in conjunction with the end of the parameter optimization processing and started after the end of the parameter optimization processing, or may be started independently of the parameter optimization processing, for example, started at arbitrary time within business hours of a production plan.

First, the production plan processing unit 103 reads the information stored in the actual system storage unit 101 and the internal information storage unit 104 (Step S2001). Specifically, the production plan processing unit 103 reads the work master storage area 110, the actual production performance storage area 120, the actual facility operation performance storage area 130, the safety stock parameter storage area 140, the accelerated production allowable day parameter storage area 150, the sales plan storage area 160, and the stock information storage area 170 of an actual system for which the parameters of a production plan are to be optimized.

Then, the production plan processing unit 103 calculates a production plan (Step S2002). Specifically, the production plan processing unit 103 calculates a production plan for the item "PROD1" as follows. A value obtained by subtracting a stock quantity of stock information from a sales quantity of a sales plan is the quantity of items to be shipped anew, and in the example of FIG. 8, the stock quantity of the items "PROD1" is 200 in total when the stock quantities of a plurality of bases are combined together. In this case, as shown in FIG. 7, among 400 items "PROD1" to be sold on Sep. 11, 220 items "PROD1" need to be shipped. It is assumed that in consideration of this fact and a transportation lead time between sites and the like, the items "PROD1" need to be shipped from its production site on no later than September 9. Assuming that the new planning parameters are used, because the allowable day of accelerated production is changed to 4 days, the production plan processing unit 103 temporarily sets September 5 as the production date. Moreover, because the percent defective of the new work master is 2%, the production plan processing unit 103 determines, through back calculation, that 225 items "PROD1" need to be produced on September 5. In processing of calculating a work time required for producing 225 items "PROD1", the production plan processing unit 103 aggregates 225 work times of 21 seconds of the new work master, to thereby obtain 4,725 seconds (78.75 minutes).

As described in the above-mentioned example, the production plan processing unit 103 uses the master and the parameter that are updated with the new master and the new planning parameter to create such a production plan as to satisfy constraint conditions required under the production plan. Note that, the constraint conditions also include working hours and break time of a worker and the like. There are a large number of processing methods as a method of creating a production plan while taking the constraint conditions into consideration, and the method is not limited to a specific method.

Next, the production plan processing unit 103 evaluates the quality of the calculated plan (Step S2003). Specifically, the production plan processing unit 103 confirms whether or not a delivery date can be met and whether or not the productivity is satisfactory based on predetermined indices. There are also a large number of methods as evaluation formulae for evaluating the quality, and in this embodiment, the method is not limited to a specific method.

As an example, there is known a method of setting a target value or a target threshold value. Specific examples conceivable as targets include a stock quantity (reference value), a production cost (reference value), overtime hours (upper-limit value), a setup time (evaluated as more satisfactory as the setup time becomes shorter), and the number of violated production constraints (evaluated as more satisfactory as the number of violations becomes smaller).

Then, when the quality of the plan is not satisfactory (when the quality is determined to be "NG" in Step S2003), the production plan processing unit 103 adjusts the production plan (Step S2004). After adjusting the production plan, the production plan processing unit 103 returns the control to Step S2002. Specifically, the processing by the parameter optimization processing unit 102 is executed in parallel with the processing by the production plan processing unit 103. In Step S2003, the processing result of Step S1005 of the parameter optimization processing is output from the output/input unit as the output screen 1100, and the new master and the new parameter are edited. After that, the production plan processing unit 103 creates a production plan again. Note that, the production plan processing unit 103 adjusts a production plan when the quality of the production plan falls below a certain level by a predetermined value or more, and there are a large number of known methods as a method of adjusting a production plan. For example, there are known a method in which a work time per day is increased by extending working hours, a method in which a worker moves to another facility or site to perform work, and a method in which the number of production sites is increased so that a plurality of sites are used. In the production planning apparatus 100, in addition to those methods that have been proposed up to now, the above-mentioned method of utilizing the parameter optimization processing unit 102 is applicable.

On the other hand, when the quality of the plan is satisfactory (when the quality is determined to be "OK" in Step S2003), the production plan processing unit 103 stores the calculated production plan in the production plan storage area 250 of the production plan storage unit 105, and ends the production plan adjustment processing. In this embodiment, the item, the facility, the input date, the production quantity, and the completion date are stored in the production plan storage area 250. Note that, at least one of the input date and the completion date only needs to be stored in the production plan storage area 250. It is to be understood that the input date and the completion date may also be indicated in a more detailed manner, namely, indicated by the time of day.

The processing described above is the processing flow of the production plan adjustment processing. Through the execution of the processing flow of the production plan adjustment processing, it is possible to adjust the master and the parameter so that a production plan with a certain level of quality may be achieved and create a production plan with an appropriate combination of the master and the parameter.

The production planning system according to the first embodiment of the present invention is described above. According to the first embodiment, a production plan with which a delivery date is met and satisfactory productivity is achieved may be created more easily.

The present invention is not limited to the first embodiment described above. The first embodiment described above can be modified in various ways within the scope of the technical idea of the present invention.

For example, in the parameter optimization processing, a new master value and a new planning parameter value that maximize the quality of a production plan may be calculated. Now, a second embodiment of the present invention, which is configured in this manner, is described.

The second embodiment has basically the same configuration as that of the first embodiment. Therefore, a configuration different from the first embodiment is mainly described below.

In Step S1004 of the parameter optimization processing, the parameter optimization processing unit 102 operates in conjunction with the production plan processing unit 103, to thereby calculate a value of the planning master and a parameter value that maximize the quality of a production plan.

More specifically, in Step S1004 of the parameter optimization processing, the parameter optimization processing unit 102 calculates a new master value, and defines a master value as a variable having a range of from the current master value to the new master value and a parameter value as a variable having a sufficiently large range. The parameter optimization processing unit 102 passes the variables to the production plan processing unit 103. In Step S2003, the production plan processing unit 103 performs processing of creating a production plan while changing the variables to various values and temporarily storing, in a memory, an on-time delivery rate and productivity and values of the variables that allows the on-time delivery rate and the productivity to be achieved. When the on-time delivery rate and the productivity are more satisfactory than the previous values stored in the memory (e.g., when a product of the on-time delivery rate and the productivity are larger than the previous one), the production plan processing unit 103 overwrites the previous values of the on-time delivery rate, the productivity, and the variables with the new values. Alternatively, when the variables exceed threshold values serving as reference values that allow an on-time delivery rate and productivity of predetermined levels or more to be achieved, the production plan processing unit 103 may overwrite the previous values of the on-time delivery rate, the productivity, and the variables with the new values, and then end the processing.

In the processing described above, after the recalculation and overwriting are performed a predetermined number of times, for a predetermined period of time, or until the values are no longer changed, the production plan processing unit 103 passes the values of the variables stored in the memory to the parameter optimization processing unit 102. This processing allows the parameter optimization processing unit 102 to automatically acquire optimum values without the need to receive a value changed manually through the output/input unit in Step S1005.

In the above, the second embodiment is described. According to the second embodiment, a new master value and a new planning parameter value that maximize the quality of a production plan may be calculated.

Further, for example, in the first embodiment and the second embodiment, the production planning apparatus 100 accesses the information of the storage units held in the production planning apparatus 100 in an accessible manner to perform various types of processing, but the present invention is not limited thereto.

For example, a master and actual performance information on an actual system may be received from the production planning apparatus 107, which is managed by another entity or located in a region different from where the production planning apparatus 100 is located, and the production planning apparatus 100 may generate a planning master and a planning parameter for the production planning apparatus 107 located in the different region and transmit the generated values to the production planning apparatus 107. This processing allows a region or an entity that does not have sufficient know-how to create a production plan to create a production plan with which a delivery date is met and a high level of productivity is achieved.

In the above, the production planning apparatus according to the embodiments of the present invention is described by way of example of generating the "work time" and the "percent defective" of the planning master and the "allowable day of accelerated production" and the "safety stock" serving as the planning parameters. However, the present invention is not limited thereto. As other values of the planning master, a facility capacity, a transportation lead time between sites, and the like may be considered as being included in variables of the planning master. Besides, for example, the following calculation of a combination can also be performed in the embodiments. Specifically, the allowable day of accelerated production is increased by enhancing a facility capacity, or a safety stock is increased by increasing a transportation lead time. Further, in the second embodiment, a plurality of values of the planning master and a plurality of parameters may be calculated simultaneously to obtain an optimal solution.

Further, for example, in the above-mentioned embodiments, the configurations are described in detail in order to clearly describe the present invention, but the present invention is not necessarily limited to an embodiment that includes all the configurations that have been described.

Further, in regard to each of the above-mentioned configurations, functions, processing units, and the like, a part thereof or an entirety thereof may be realized by hardware, for example, by being designed as an integrated circuit. Further, control lines and information lines that are assumed to be necessary for the sake of description are illustrated, but not all the control lines and the information lines on a product are illustrated. In actuality, it may be considered that almost all the configurations are connected to one another.

Further, technical elements of the above-mentioned embodiments may be applied alone, or may be applied by being divided into a plurality of portions such as program parts and hardware parts.

The embodiments of the present invention have been mainly described above.

What is claimed is:

1. A production planning apparatus, comprising:
    a storage unit configured to store:
        actual performance information on a resource required for production;
        a planning master including a plan of a resource required for work of the production, the plan of the resource including a percent defective of an item specifying a product or a part of the product to be produced under the production; and
        a planning parameter including a variable required for a production plan, the planning parameter including information specifying a safety stock which is information specifying a safety stock quantity of the item, the safety stock being set in preparation for deterioration of the percent defective of the item;

a parameter generation processing unit configured to change the plan of the resource required for the work including the percent defective of the item, which is included in the planning master, based on a difference between the plan of the resource, which is included in the planning master, and actual performance of the resource required for the production, which is included in the actual performance information, and change the planning parameter including the information specifying the safety stock based on how greatly the planning master is changed; and a production plan processing unit configured to calculate a production plan that uses the planning master and the planning parameter.

2. A production planning apparatus according to claim 1, wherein the actual performance information includes information specifying an input quantity for production and a completed quantity, wherein the percent defective included in the planning master is a planned percent defective, and wherein the parameter generation processing unit is further configured to use the input quantity for production and the completed quantity, which are included in the actual performance information, to calculate an actual value of a percent defective of the item, change the planned percent defective of the item included in the planning master based on a difference between the actual value and the planned percent defective included in the planning master, and change the information specifying the safety stock based on how greatly the planned percent defective included in the planning master is changed.

3. A production planning apparatus according to claim 1, wherein the actual performance information includes information specifying a production quantity and a period of time required for production, wherein the planning master includes a work time, and wherein the parameter generation processing unit is further configured to change the work time included in the planning master based on a difference between an actual value of the work time, which is calculated based on the production quantity and the period of time required for production included in the actual performance information, and the work time included in the planning master, and change the planning parameter based on how greatly the work time included in the planning master is changed.

4. A production planning apparatus according to claim 1, wherein the storage unit includes master change influence information including a basis on which information included in the planning parameter is to be changed based on an increase or decrease of the information included in the planning master, and wherein the parameter generation processing unit is further configured to change the planning parameter in accordance with the master change influence information.

5. A production planning apparatus according to claim 1, wherein the parameter generation processing unit is further configured to increase the safety stock quantity of the item based on a decreased amount of the percent defective of the item.

6. A production planning apparatus according to claim 1, wherein the production plan processing unit is further configured to identify a combination of the planning master and the planning parameter that maximizes an on-time delivery rate and productivity through a combinatorial optimization procedure.

7. A production planning apparatus according to claim 1, wherein the production plan processing unit is further configured to receive a threshold value of an on-time delivery rate in the calculation of the production plan, and identify a combination of the planning master and the planning parameter that allows the on-time delivery rate to exceed the threshold value.

8. A production planning apparatus according to claim 1, wherein the safety stock of the item is set in preparation for deterioration of the percent defective of the item until the percent defective becomes stable, such that when a period in which the percent defective of the item becomes stable is observed, a stock quantity of the item is adjusted so as to minimize the safety stock quantity of the item to be held after the period.

9. A production planning apparatus, comprising:
a parameter generation processing unit configured to:
receive, from an external apparatus, actual performance information on a resource required for production and a planning master including a plan of a resource required for work of the production, the plan of the resource including a percent defective of an item specifying a product or a part of the product to be produced under the production;

change the plan of the resource required for the work including the percent defective of the item, which is included in the planning master, based on a difference between the plan of the resource, which is included in the planning master, and actual performance of the resource required for the production, which is included in the actual performance information; and calculate a planning parameter including a variable required for a production plan based on how greatly the planning master is changed, the planning parameter including information specifying a safety stock which is information specifying a safety stock quantity of the item, the safety stock being set in preparation for deterioration of the percent defective of the item; and an output unit configured to transmit the planning master and the planning parameter to the external apparatus.

10. A production planning apparatus according to claim 9, wherein the actual performance information includes information specifying an input quantity for production and a completed quantity, wherein the percent defective included in the planning master is a planned percent defective, and wherein the parameter generation processing unit is further configured to use the input quantity for production and the completed quantity, which are included in the actual performance information, to calculate an actual value of a percent defective of the item, change the planned percent defective of the item included in the planning master based on a difference between the actual value and the planned percent defective included in the planning master, and change the information specifying the safety stock based on how greatly the planned percent defective included in the planning master is changed.

11. A production planning apparatus according to claim 9, wherein the actual performance information includes information specifying a production quantity and a period of time required for production, wherein the planning master includes a work time, and
wherein the parameter generation processing unit is further configured to change the work time included in the planning master based on a difference between an actual value of the work time, which is calculated based on the production quantity and the period of time required for production included in the actual performance information, and the work time included in the planning master, and change the planning parameter based on how greatly the work time included in the planning master is changed.

12. A production planning apparatus according to claim 9, wherein the parameter generation processing unit is further configured to receive, from the external apparatus, master change influence information including a basis on which information included in the planning parameter is to be changed based on an increase or decrease of the information included in the planning master, and
wherein the parameter generation processing unit is further configured to change the planning parameter in accordance with the master change influence information.

13. A production planning apparatus according to claim 9, wherein the parameter generation processing unit is further configured to increase the safety stock quantity of the item based on a decreased amount of the percent defective of the item.

14. A production planning apparatus according to claim 9, wherein the safety stock of the item is set in preparation for deterioration of the percent defective of the item until the percent defective becomes stable, such that when a period in which the percent defective of the item becomes stable is observed, a stock quantity of the item is adjusted so as to minimize the safety stock quantity of the item to be held after the period.

15. A production planning method for causing a computer to execute a procedure for planning production,
the computer comprising:
  a storage unit configured to store:
    actual performance information on a resource required for production;
    a planning master including a plan of a resource required for work of the production, the plan of the resource including a percent defective of an item specifying a product or a part of the product to be produced under the production; and
    a planning parameter including a variable required for a production plan, the planning parameter including information specifying a safety stock which is information specifying a safety stock quantity of the item, the safety stock being set in preparation for deterioration of the percent defective of the item; and
  a control unit,
the production planning method comprising executing, by the control unit:
  a parameter generation processing step of changing the plan of the resource required for the work including the percent defective of the item, which is included in the planning master, based on a difference between the plan of the resource, which is included in the planning master, and actual performance of the resource required for the production, which is included in the actual performance information, and changing the planning parameter including the information specifying the safety stock based on how greatly the planning master is changed; and
  a production plan processing step of calculating a production plan that uses the planning master and the planning parameter.

16. A production planning method according to claim 15, wherein the actual performance information includes information specifying an input quantity for production and a completed quantity,
wherein the percent defective included in the planning master is a planned percent defective, and
wherein the parameter generation processing step further includes using the input quantity for production and the completed quantity, which are included in the actual performance information, to calculate an actual value of a percent defective of the item, changing the planned percent defective of the item included in the planning master based on a difference between the actual value and the planned percent defective included in the planning master, and changing the information specifying the safety stock based on how greatly the planned percent defective included in the planning master is changed.

17. A production planning method according to claim 15, wherein the actual performance information includes information specifying a production quantity and a period of time required for production,
wherein the planning master includes a work time, and
wherein the parameter generation processing step further includes changing the work time included in the planning master based on a difference between an actual value of the work time, which is calculated based on the production quantity and the period of time required for production included in the actual performance information, and the work time included in the planning master, and changing the planning parameter based on how greatly the work time included in the planning master is changed.

18. A production planning method according to claim 15, wherein the parameter generation processing step further includes receiving, from the external apparatus, master change influence information including a basis on which information included in the planning parameter is to be changed based on an increase or decrease of the information included in the planning master, and changing the planning parameter in accordance with the master change influence information.

19. A production planning method according to claim 15, wherein the parameter generation processing step further includes increasing the safety stock quantity of the item based on a decreased amount of the percent defective of the item.

20. A production planning method according to claim 15, wherein the safety stock of the item is set in preparation for deterioration of the percent defective of the item until the percent defective becomes stable, such that when a period in which the percent defective of the item becomes stable is observed, a stock quantity of the item is adjusted so as to minimize the safety stock quantity of the item to be held after the period.

* * * * *